(12) United States Patent
Kitazawa et al.

(10) Patent No.: US 6,801,714 B2
(45) Date of Patent: Oct. 5, 2004

(54) CAMERA APPARATUS

(75) Inventors: Tomoyasu Kitazawa, Kanagawa (JP);
Noriyuki Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/926,573

(22) Filed: Sep. 4, 1997

(65) Prior Publication Data

US 2001/0012445 A1 Aug. 9, 2001

(30) Foreign Application Priority Data

Sep. 5, 1996 (JP) .............................. 8-235461

(51) Int. Cl.[7] .............................................. H04N 5/225
(52) U.S. Cl. ...................... 386/120; 386/117; 348/220
(58) Field of Search ................... 386/38, 117, 118–119, 386/120, 67–68; 348/220–221, 227; 358/906, 909.1

(56) References Cited

U.S. PATENT DOCUMENTS

| | | | |
|---|---|---|---|
| 4,531,164 A | | 7/1985 | Maeda et al. |
| 4,544,959 A | * | 10/1985 | Kozuki et al. ............... 386/119 |
| 4,827,332 A | * | 5/1989 | Miyake et al. ............... 348/227 |
| 5,166,840 A | * | 11/1992 | Nemoto et al. ............. 358/906 |
| 5,206,739 A | * | 4/1993 | Miyaji ........................ 386/119 |
| 5,379,159 A | | 1/1995 | Lemelson |
| 5,592,220 A | * | 1/1997 | Ishii et al. ................... 348/220 |
| 5,864,647 A | * | 1/1999 | Takeuchi et al. ............... 386/68 |
| 6,047,102 A | * | 4/2000 | Ohta ........................... 386/120 |
| 6,400,891 B1 | * | 6/2002 | Noda et al. .................. 386/120 |

FOREIGN PATENT DOCUMENTS

| | | |
|---|---|---|
| EP | 0 511 653 | 11/1992 |
| EP | 0 642 274 | 3/1995 |

* cited by examiner

*Primary Examiner*—Thai Tran
*Assistant Examiner*—Christopher Onuaku
(74) *Attorney, Agent, or Firm*—Frommer Lawrence & Haug LLP; William S. Frommer; Dennis M. Smid

(57) ABSTRACT

The digitized image signal and audio signal are synthesized in a predetermined format by the digital signal processor circuit 6 and the synthesized signal is supplied to the VTR unit 10 for carrying out the digital recording. The image signal from the digital signal processor circuit 6 is supplied to the viewfinder 11 for displaying the processed image signal. The system control circuit 13 is provided which controls the processing operations in the digital signal processor circuit 6 and the VTR unit 10. To this system control circuit 13 is supplied the signal from the standby switch 14 for switching among the power supply off, the VTR mode, the camera (animated picture) standby and the photo (still picture) standby. Also, to this system control circuit 13 is supplied the signal from the push button 15 for controlling the start/stop of recording the camera (animated picture) and the still picture recording.

3 Claims, 2 Drawing Sheets

CAMERA APPARATUS

BACKGROUND OF THE INVENTION

1. Field of the Invention

The present invention relates to a camera apparatus which is suitable for applicable to, for example, a digital VTR and a disk recorder.

2. Description of the Related Art

In a VTR integrated type camera apparatus, an image signal picked up by an imaging unit is processed to be recorded in an arbitrary format in a VTR unit. Such an apparatus, for example, the digital VTR is able not only to record the picked-up image signal in an animated picture, but also to take out any one scene of the picked-up image signal and to record the scene in a still picture by repeating the same for a predetermined period of time.

Accordingly, in the VTR integrated type camera apparatus capable of recording both of the animated picture and the still picture, for the purpose of making these both recordings to be well performed, it has been practiced in the past to provide respective operation means for controlling the respective recordings separately, for example, in order to make good operations to be performed in accordance with the respective purposes. However, if downsizing the apparatus and reducing production costs or the like are advanced, it is going to be difficult to provide such operation means independently.

SUMMARY OF THE INVENTION

In view of such aspects, it is an object of the present invention to provide a satisfactory camera apparatus in which the recording operation means for the animated picture and the recording operation means for the still picture are replaced by a single operation means, thereby enabling the downsizing of the apparatus and the like, and which makes it possible to provide a satisfactory camera apparatus.

The present invention is arranged so that a single operation means can serve as both an operation means for recording an animated picture and an operation means for recording a still picture in the VTR integrated type camera apparatus in which an image signal picked up by an imaging unit is converted into an image signal for the animated picture or the still picture to be recorded in a VTR unit.

DESCRIPTION OF THE PREFERRED EMBODIMENT

Figure 1:
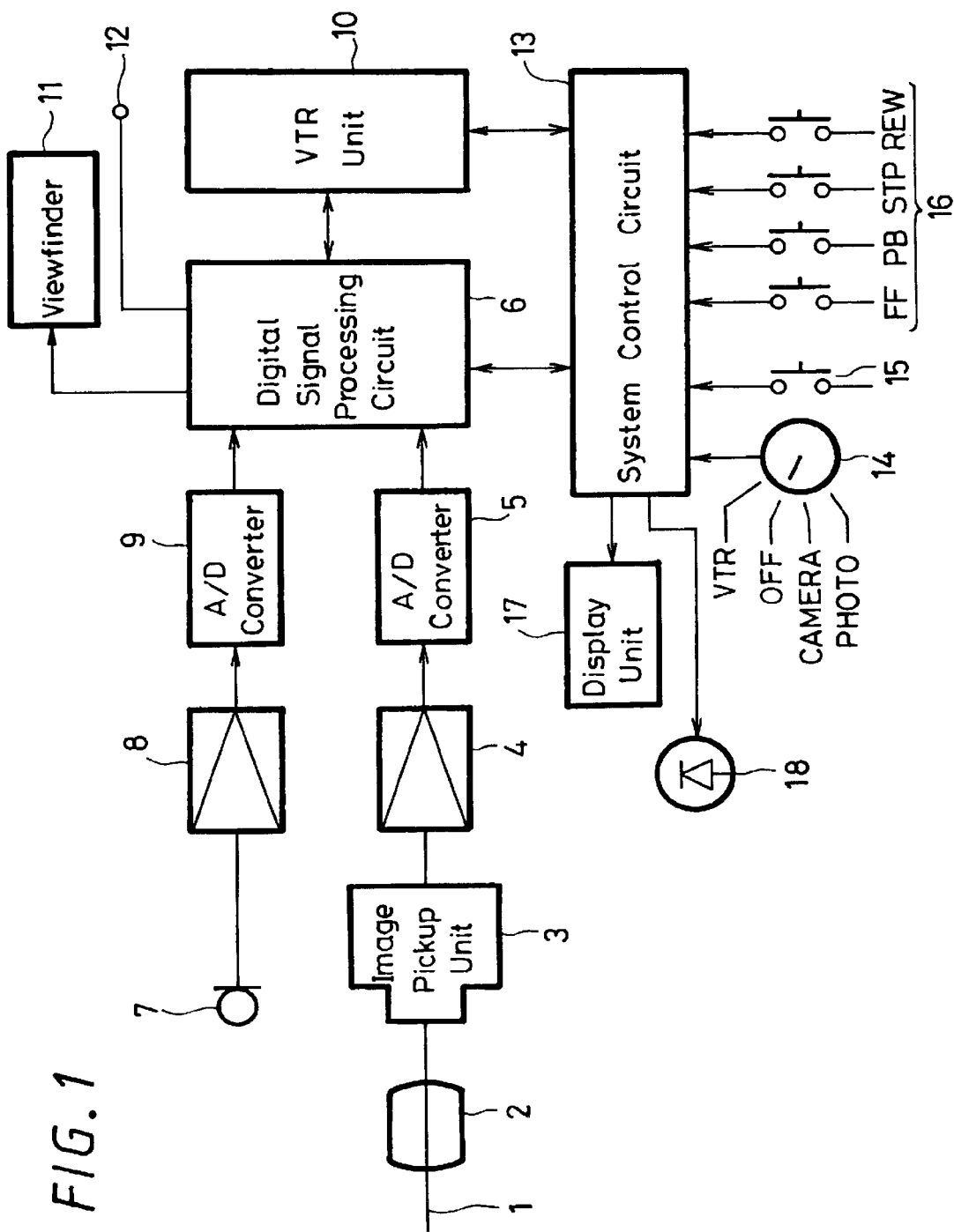
FIG. 1 is a configuration diagram of an example of a VTR integrated type camera apparatus to which the present invention is applied.

Now, the present invention will be described with reference to the accompanied drawings. FIG. 1 is a block diagram showing an example of a configuration of a VTR integrated type camera apparatus to which the present invention is applied.

In FIG. 1, an image light 1 from an object (not shown) is supplied through a lens system 2 to an imaging unit 3. An image signal from the imaging unit 3 is supplied through an amplifier 4 to an A/D converter circuit 5 and then a digitized image signal is supplied therefrom to a digital signal processor circuit 6. Also, an audio signal collected by a microphone 7 is supplied through an amplifier 8 to an A/D converter circuit 9 and then a digitized audio signal is supplied therefrom to the digital signal processor circuit 6.

These digitized image signal and audio signal are synthesized together in a predetermined format in the digital signal processor circuit 6 and then the synthesized signal is supplied to a VTR unit 10 which performs a digital recording thereof. The image signal from the digital signal processor circuit 6 is supplied to a viewfinder 11 for performing a display of the image signal processed by the digital signal processor circuit 6. Further, the image signal supplied to the viewfinder 11 is also delivered to an image output terminal 12. In this case, although there is shown as an example that the recording is carried out by the VTR unit 10, it is needless to say that the present invention can be applied to a recording medium, a recording apparatus using a disk-like recording medium, a recording apparatus using a semiconductor memory, and so on.

Moreover, a system control circuit 13 is provided for controlling the processing operations in the digital signal processor circuit 6 and the VTR unit 10. To this system control circuit 13 is supplied a signal from a standby switch 14 which performs a switching among a power supply off, a VTR mode, a camera (animated picture) standby and a photo (still picture) standby. Also, to the system control circuit 13 is supplied a signal from a push button 15 which controls a start/stop of recording of the camera animated picture and the still picture recording.

Furthermore, a VTR operation button 16 which performs operations of the VTR (fast forward FF, playback PB, stop STP and rewind REW) is provided, for example, and signals from the VTR operation button 16 or the like supplied to the system control circuit 13. Then, the signals from the system control circuit 13 are supplied to a display unit 17, a tally lamp 18 or the like and also supplied to the viewfinder 11 through the digital signal processor circuit 6.

Figure 2:
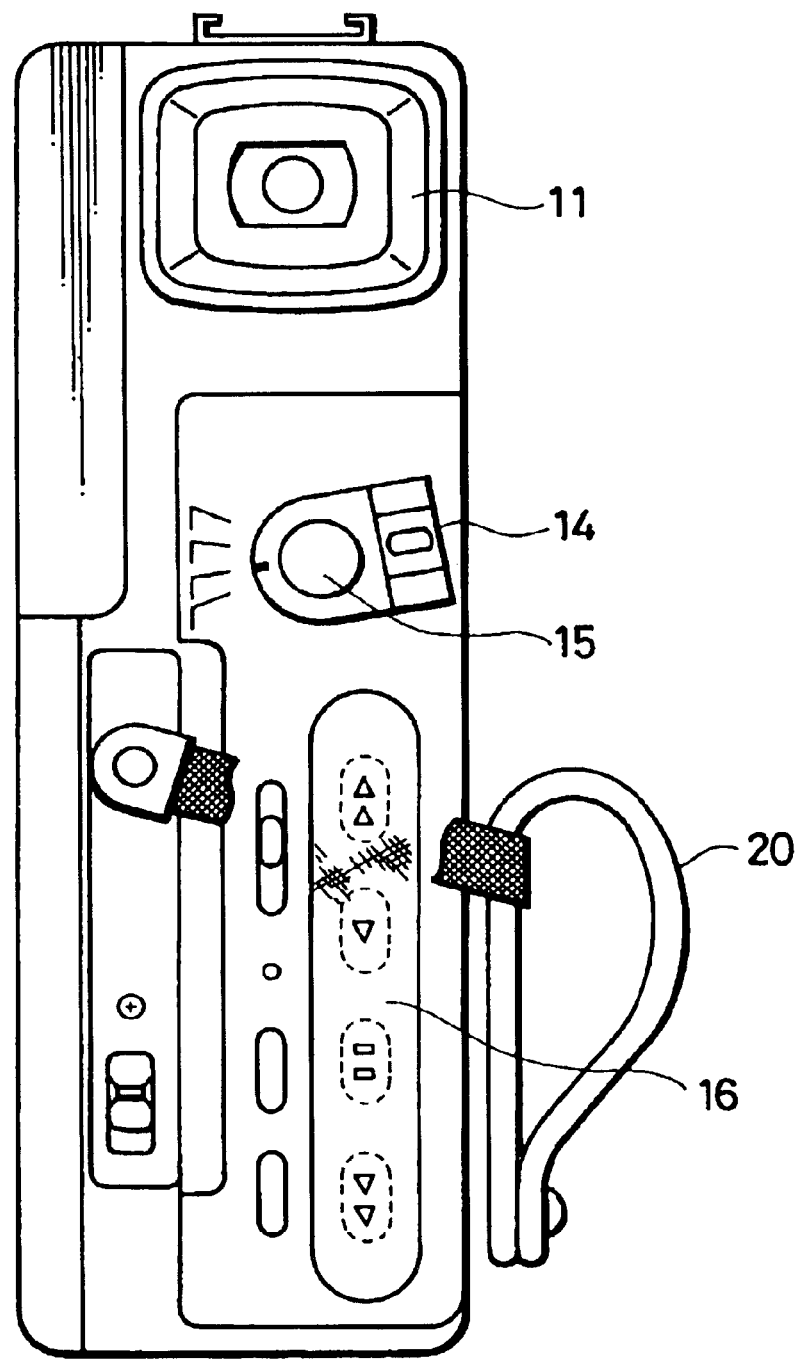
FIG. 2 is a view showing an appearance of a main part of an example of the VTR integrated type camera apparatus to which the present invention is applied.

FIG. 2 is a view showing an appearance of the VTR integrated type camera apparatus according to the present invention used to explain the same. FIG. 2 illustrates a rear surface of the apparatus. In FIG. 2, the viewfinder 11 is arranged in the upper part side on the rear surface of the apparatus, the standby switch 14 is arranged in the lower side of the viewfinder 11. The push button 15 is arranged at the center of the standby switch 14. The standby switch 14 is made to be rotatable with the push button as a center and the pushing direction of the push button 15 as its rotary axis. Further, in the under part side of the apparatus are arranged the VTR operation button 16 and so on. Also, on the side part of the apparatus is provided a grip belt 20.

In the present apparatus, the standby switch 14 and the push button 15 are placed in such a position where, for example, a cameraman can reach them by his forefinger and thumb of his right hand in a condition that his right hand is passed through the grip belt 20. In this way, for example, the cameraman can operate the standby switch 14 and the push button 15 using his forefinger and thumb in a condition that he holds the apparatus while looking in the viewfinder 11.

In the present apparatus, the cameraman rotates the standby switch 14 by the thumb or the like of this right hand to select any one state of the power supply off, the VTR mode, the camera standby, and the photo standby. For example, if the standby switch 14 is set to, for example, the camera standby, the system control circuit 13 outputs a control signal for recording the animated picture and then the digital signal processor circuit 6 is set to a mode of recording the animated picture. If the push button 15 is pressed under this condition, at the first push action the animated picture begins to be recorded in the VTR unit 10 and at the second push action this recording of the animated picture is stopped. This operation is repeatedly performed whenever the push button 15 is pressed during, for example, the mode of recording the animated picture.

Also, if the standby switch 14 is set, for example, to the photo standby, the system control circuit 13 outputs a control signal for recording the still picture and then the digital signal processor circuit 6 is set, to a mode of recording the still picture. If the push button 15 is pressed under this condition, at the moment of push one scene of the image signal is extracted by the digital signal processor circuit 6. The one scene of the image signal is recorded repeatedly for a predetermined time in the still picture in the VTR unit 10.

In addition, in the digital signal processor circuit 6, the image signal from the imaging unit 3 is processed in every field, for example, in the normal mode of recording the animated picture. Contrary to this, in the mode of recording the still picture, a processing way is altered. For example, the image signal of one field is interpolated to form an image signal at every frame. Further, during the recording operation of the VTR unit 10, for example, the tally lamp 18 is turned on for indicating that the recording is going on.

Thus, the present apparatus has the single operation means which is used as the recording operation means for the animated picture and as the recording operation means for the still picture, thereby causing nothing to prevent the downsizing of the apparatus and the like, which enables the satisfactory VTR integrated type camera apparatus to be provided. Therefore, according to the present invention, it is possible to easily solve the conventional problem on downsizing the apparatus and reducing the production costs, etc.

Moreover, in the aforesaid apparatus, if the standby switch 14 is set, for example, to the VTR mode, the system control circuit 13 outputs a control signal for the VTR mode and then, for example, the digital signal processor circuit 6 is set to the VTR mode. Under this condition, for example, the playback or the like may be performed in the VTR unit 10 using the VTR operation button 16 for the aforesaid operation of the VTR (fast forward FF, playback PB, stop STP and rewind REW).

In this way, according to the present invention described above, in the VTR integrated type camera apparatus in which the image signal picked up by the imaging unit is converted into the image signal for the animated picture or the still picture so as to be recorded in the VTR unit, by providing the single operation means which serves as the recording operation means for the animated picture and as the recording operation means for the still picture, nothing will prevent the downsizing of the apparatus and the like, which allows the satisfactory VTR integrated type camera apparatus to be provided.

According to the present invention, by providing the single operation means which is used as the recording operation means for the animated picture and as the recording operation means for the still picture, such an obstacle to the downsizing of the apparatus and like is eliminated, thereby enabling the satisfactory VTR integrated type camera apparatus to be obtained.

Therefore, while there was in the prior art the problems on the downsizing of the apparatus or the reduction of production costs and the like, it is possible to easily solve these problems according to the present invention.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A camera apparatus comprising:

an imaging unit;

a video recorder unit;

means for converting an image signal picked up by said imaging unit into video signal for an animated picture or a still picture to record said video signal on a recording medium;

selector means having a single rotatable standby switch for selecting any one of a standby state for enabling recording of said animated picture, a standby state for enabling repeated recording of said still picture for a predetermined time, a power off state, and a video recorder mode for enabling operations to be performed by a video recorder unit;

operation means having a processing circuit and a control circuit which are commonly used for both an operation for recording said animated picture and an operation for recording said still picture, said operation means further having a single start/stop button for enabling an operator to start or stop only the one of the recording of said animated picture and the recording of said still pictures selected by said selector means by activating only said single start/stop button;

wherein said start/stop button is positioned within said standby switch such that said standby switch is rotatable about said start/stop button.

2. A camera apparatus according to claim 1, wherein said operation means carries out the recording operation for the animated picture in the recording standby state for the animated picture, and said operation means carries out the recording operation for the still picture in the recording standby state for the still picture.

3. A camera apparatus according to claim 2, wherein said standby switch and said start/stop button are arranged in a concentric circle form.

* * * * *